United States Patent [19]
Bartholomew

[11] Patent Number: 5,826,920
[45] Date of Patent: Oct. 27, 1998

[54] CONDUIT COUPLING

[75] Inventor: Donald D. Bartholomew, Mt. Clemens, Mich.

[73] Assignee: Proprietary Technology, Inc., Bloomfield Hills, Mich.

[21] Appl. No.: 649,646
[22] PCT Filed: Nov. 29, 1993
[86] PCT No.: PCT/US93/11622
    § 371 Date: May 20, 1996
    § 102(e) Date: May 20, 1996
[87] PCT Pub. No.: WO95/14879
    PCT Pub. Date: Jun. 1, 1995

[51] Int. Cl.[6] .................................................. F61L 37/08
[52] U.S. Cl. ........................................ 285/305; 285/321
[58] Field of Search ............................... 285/305, 319, 285/321, 921; 403/326, 329, 377, 108; 411/353, 352, 522, 558

[56] References Cited

U.S. PATENT DOCUMENTS

| | | |
|---|---|---|
| 2,167,258 | 7/1939 | Wilson . |
| 3,091,483 | 5/1963 | Hruby, Jr. . |
| 3,603,621 | 9/1971 | Parsons . |
| 3,610,664 | 10/1971 | Hansson . |
| 3,666,297 | 5/1972 | Marks . |
| 3,923,323 | 12/1975 | Brogan . |
| 3,948,548 | 4/1976 | Voss ........................................ 285/321 |
| 4,068,863 | 1/1978 | Lasko . |
| 4,126,335 | 11/1978 | Voss ........................................ 285/321 |
| 4,191,408 | 3/1980 | Acker . |
| 4,243,254 | 1/1981 | Hill et al. . |
| 4,256,335 | 3/1981 | Nielsen, Jr. . |
| 4,526,411 | 7/1985 | Bartholomew . |
| 4,592,943 | 6/1986 | Hama et al. . |
| 4,637,640 | 1/1987 | Fournier . |
| 4,643,466 | 2/1987 | Conner et al. . |
| 4,712,813 | 12/1987 | Passerell et al. . |
| 4,721,331 | 1/1988 | Lamelchtrich . |
| 4,810,009 | 3/1989 | Legris . |
| 4,811,975 | 3/1989 | Paul, Jr. et al. . |
| 4,828,297 | 5/1989 | Tarum . |
| 4,832,378 | 5/1989 | Zepp . |
| 4,842,309 | 6/1989 | LaVene et al. . |
| 4,844,515 | 7/1989 | Field . |
| 4,867,484 | 9/1989 | Guest . |
| 4,948,175 | 8/1990 | Bartholomew . |
| 5,056,756 | 10/1991 | Norkey et al. ............................ 285/321 |
| 5,064,227 | 11/1991 | Spors et al. ............................... 285/319 |
| 5,105,787 | 4/1992 | Imoehl . |
| 5,141,264 | 8/1992 | Usui ......................................... 285/319 |
| 5,603,532 | 2/1997 | Guest ....................................... 285/321 |

FOREIGN PATENT DOCUMENTS

| | | |
|---|---|---|
| 0193271 | 9/1986 | European Pat. Off. . |
| 801859 | 9/1958 | United Kingdom . |
| WO 92/08920 | 5/1992 | WIPO . |

Primary Examiner—Eric K. Nicholson
Attorney, Agent, or Firm—Harness, Dickey & Pierce, PLC

[57] ABSTRACT

A conduit coupling (20) is comprised of a male conduit (22), a mating female member (24), means for sealing (26) and a fastener (28) to couple the male conduit (22) to the female member (24). The male conduit (22) has a first and second expanded diametral portions (46 and 50) separated by a nominal diametral portion (48). The sealing means (26) externally surrounds the nominal diametral portion (48) and prevents fluid from passing between an exterior surface (40) of the male conduit (22) and an adjacent inside surface (74) of the female member (24). Thus, the total longitudinal length of the conduit coupling (20) is less than most threaded couplings.

20 Claims, 3 Drawing Sheets

CONDUIT COUPLING

BACKGROUND OF THE INVENTION

This invention relates generally to a conduit coupling through which fluid flows and specifically to a male conduit having expanded diametral portions thereof for insertion within a female member.

In the automotive industry, as well as for many other industries, the need always exists for low cost, reliable and easy to assembly components. This need is especially apparent with respect to providing a connection between fluid conveying conduits such as fuel, brake or refrigerant lines. Traditionally, such a connection is comprised of a male tubular member being retained within a female housing by a threaded fitting, bolted-on flanged brackets or flare fittings.

More recently, snap together quick connect attachments have been used in place of the aforementioned conventional devices. In order to retain such a quick connect fastener, many tubular members have a bead circumferentially located therearound. This bead may be integrally formed or mechanically attached onto the outside surface of the male conduit. Furthermore, it is important that this bead be firmly attached to a predetermined longitudinal position on the male conduit in order to maintain a secure and leak resistant fit within the mating female housing or connector half. If such a connection were to become dislodged or leak, the vehicle could become disabled. While quick connect fasteners are significant improvements within the art, the male conduits used in combination therewith have not adequately provided a low cost and secure sealing seat integral with the male conduit. Furthermore, conventional couplings allow the male conduit to axially move in relation to the adjacent female housing. Therefore, it would be desirable to have a conduit coupling which provides a low cost, longitudinally secure and integral sealing seat on a male conduit which also promotes axial alignment with the mating female housing thereby avoiding the aforementioned problems.

SUMMARY OF THE INVENTION

In accordance with the present invention, the preferred embodiment of a conduit coupling is comprised of a male conduit, a mating female member, means for sealing and a fastener to couple the male conduit to the female member. The male member has a first and second expanded diametral portions separated by a nominal diametral portion. The sealing means externally surrounds the nominal diametral portion and prevents fluid from passing between an exterior surface of the male conduit and an adjacent inside surface of the female member. In another aspect of the present invention, a quick connect fastener couples the male conduit within the female member.

The conduit coupling of the present invention is advantageous over conventional couplings in that a sealing seat is integrally formed within a male conduit. Thus, a low cost and longitudinally accurate sealing retention area is created. Furthermore, the present invention conduit coupling is also advantageous since a first and second expanded diametral portions on the male conduit also serve as axial alignment bearing surfaces against an inside surface of a female member. An additional benefit is that the conduit coupling of the present invention is longitudinally compact as compared to many traditional attachment systems. Additional advantages and features of the present invention will become apparent from the following description and appended claims, taken in conjunction with the accompanying drawings.

DETAILED DESCRIPTION OF THE PREFERRED EMBODIMENTS

A conduit coupling can be used to join a pair of mating tubular members or conduits to one another. For example, a pair of brake, coolant, pneumatic or other flexible hoses may be attached to one another within an automotive vehicle. A conduit coupling can also be used to join a conduit to a fluid carrying structure. For example, a flexible or rigid conduit may be coupled to an engine block, radiator or exhaust pipe.

Figure 1:
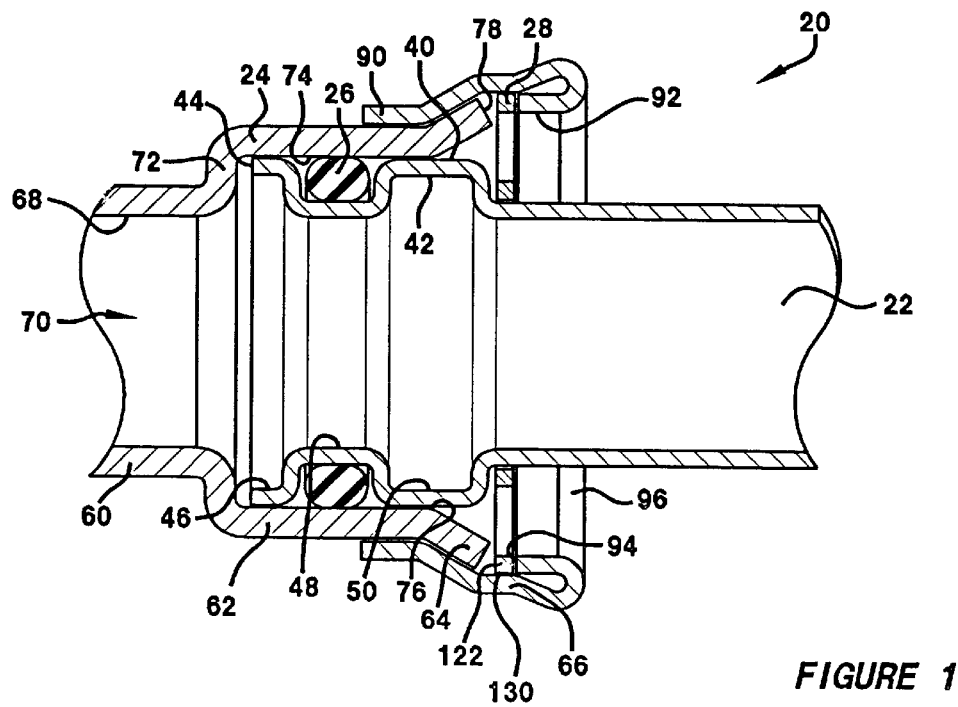
FIG. 1 is a sectional view showing a first preferred embodiment of a conduit coupling of the present invention.

Referring to FIG. 1, a first preferred embodiment of a swivelable conduit coupling 20 is comprised of a male conduit 22, a female member 24, a seal 26 and a quick connect fastener 28. Male conduit 22 is a somewhat rigid metallic member which is securely affixed within the end of a flexible hose (not shown). Male conduit 22 has an exterior surface 40 and an interior surface 42 joined by a distal edge 44. Male conduit 22 also has a first expanded diametral portion 46, a nominal diametral portion 48 and a second expanded diametral portion 50. Each diametral portion 46, 48 and 50 has a substantially cylindrical cross sectional shape thereto. Furthermore, expanded diametral portions 46 and 50 each have substantially the same diameter while the diameter of nominal diametral portion 48 is relatively smaller. Thus, a sealing seat is defined within this radially grooved area.

Female member 24 has a female conduit 60, a receptacle 62, a flange 64 and a collar 66. Female conduit 60 has an inner surface 68 of substantially cylindrical cross sectional shape defining a passageway 70 therethrough. Receptacle 62 is joined to female conduit 60 by a radially projecting ledge 72. Receptacle 62 has an inside surface 74 which defines a substantially cylindrical bore therethrough. Flange 64 has a frusto-conical cross sectional shape with a constricted portion 76 connected to receptacle 62. Flange 64 also has a distal edge 78 which is opposite from constricted portion 76. Collar 66 has a substantially cylindrical body 90 which snugly surrounds a portion of receptacle 62 and flange 64. An arm 92 is inwardly turned from body 90 of collar 66 so as to create a shoulder 94. Collar 66 further has a lead-in portion 96 which defines an open end of female member 24. An inwardly projecting tab or other means may also be incorporated within collar 66 to prevent longitudinal misplacement along receptacle 62.

Seal 26 is preferably an elastomeric O-ring which is preassembled to male conduit 22 within the sealing seat defined by portions 46, 48 and 50 of male conduit 22. However, seal 26 could alternatively consist of a closed cell sponge-like material, a pumpable sealant, a thumb grade sealant, or other sealing means known to one skilled in the art.

Figure 6:
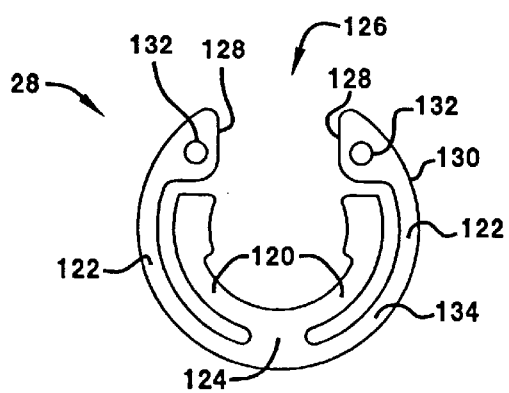
FIG. 6 is an end elevational view showing a first preferred embodiment of a quick connect fastener used in the present invention conduit coupling of FIGS. 1 and 2.

As can best be observed in FIGS. 1 and 6, quick connect fastener 28 is a flat washer-like device having a pair of central jaws 120, also known as a central attachment section, and a pair of outer jaws 122, also known as an outer attachment section. Central jaws 120 and outer jaws 122 are connected to each other through a neck section 124. Furthermore, central jaws 120 define a substantially semi-circular shape therebetween which is compressibly affixed around exterior surface 40 of male conduit 22 longitudinally adjacent to second expanded diametral portion 50 thereof opposite from distal edge 44. Outer jaws 122 create a substantially circular shape substantially concentric with central jaws 120. However, a gap 126 is located between a distal end 128 of each outer jaw 122. Moreover, a peripheral edge 130 of outer jaws 122 is inwardly compressed by lead-in portion 96 and inwardly turned arm 92 of collar 66 when quick connect fastener 28 is longitudinally inserted within female member 24. Insertion may be further enhanced through use of a tool (not shown) which can be inserted within openings 132 in outer jaws 122. When fully inserted, outer jaws 122 are outwardly urged such that a face 134 thereof abuts against shoulder 94 of collar 66. Quick connect fastener 28 is made from a sheet of strip stock steel.

When male conduit 22 is fully inserted within receptacle 62, expanded diametral portions 46 and 50 provide bearing surfaces which inhibit axial misalignment in relation to female member 24. Furthermore, the sealing seat created between portions 46, 48 and 50 of male conduit 22 accurately control the radial compression and longitudinal location of seal 26.

Figure 7:
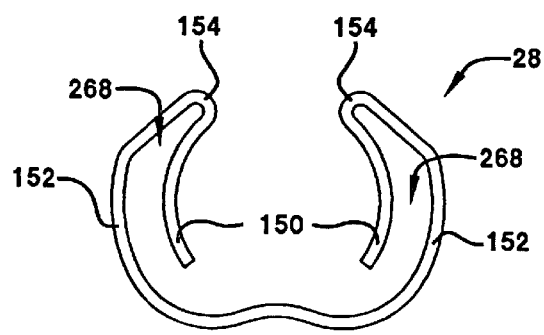
FIG. 7 is an end elevational view showing a second preferred embodiment of a quick connect fastener used in the present invention conduit coupling of FIGS. 3 and 4.

A second preferred embodiment of a quick connect fastener 28 is shown in FIG. 7. This fastener 28 is formed from a semi-flexible wire and has a pair of central jaws 150, also known as a central attachment section, and a pair of outer jaws 152, also known as an outer attachment section. Central jaws 150 and outer jaws 152 are connected to each other through elbow sections 154. Central jaws 150 compressibly engage male conduit 22 (see FIG. 1) and outer jaws 152 engage collar 66 (see FIG. 1) of female member 24 (see FIG. 1).

Figure 2:
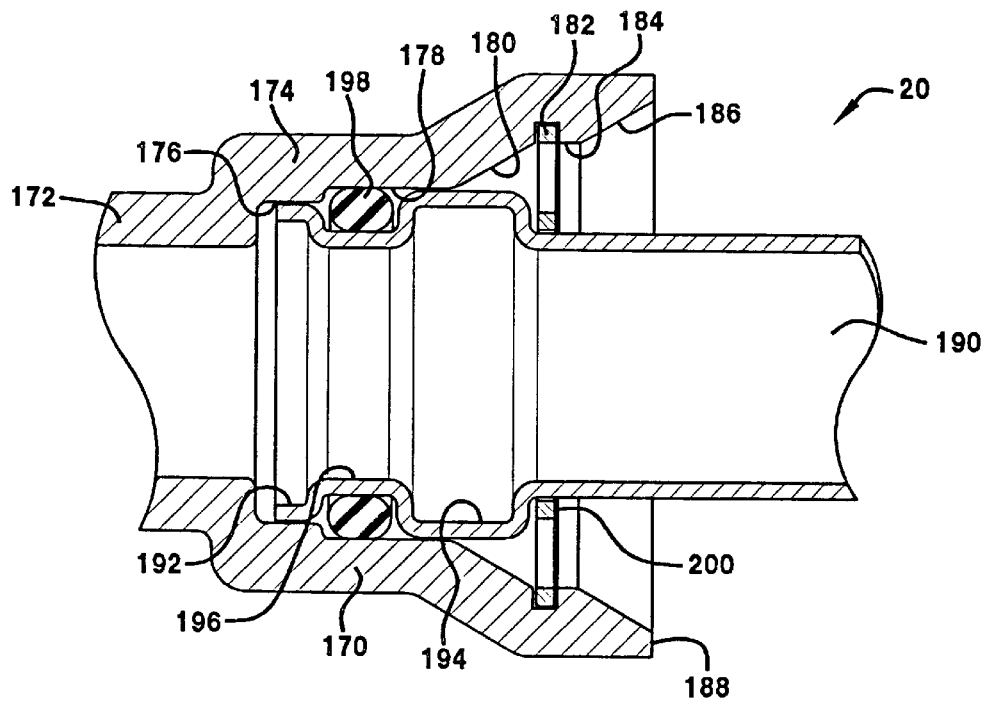
FIG. 2 is a sectional view showing a second preferred embodiment of a conduit coupling of the present invention.

A second preferred embodiment of conduit coupling 20 of the present invention is shown in FIG. 2. A female member 170 has a female conduit 172 and a female receptacle 174. Female receptacle 174 is defined by a first inside surface 176 and a longitudinally adjacent second inside surface 178. First inside surface 176 has a relatively smaller substantially cylindrical cross sectional diameter as compared to second inside surface 178 which also has a substantially cylindrical cross sectional shape. Receptacle 174 further has a chamfered surface 180, a grooved undercut 182, an intermediate surface 184 and a tapered lead-in surface 186. Tapered lead-in surface 186 is proximate with an open end 188 of female member 170. In this embodiment, a male conduit 190 is substantially similar to that of the first preferred embodiment, however, a first expanded diametral portion 192 has a diameter congruent with first inside surface 176 of female member 170. Also, a second expanded diametral portion 194 of male conduit 190 has a diameter congruent with second inside surface 178 of female member 170. Accordingly, the diameter of second expanded diametral portion 194 is greater than that of first expanded diametral portion 192. Nevertheless, a nominal diametral portion 196 acts in concert with the adjacent expanded diametral portions 192 and 194 to provide a sealing seat for a seal 198. A quick connect fastener 200 is used to couple male conduit 190 to undercut 182 of female member 170.

Figure 3:
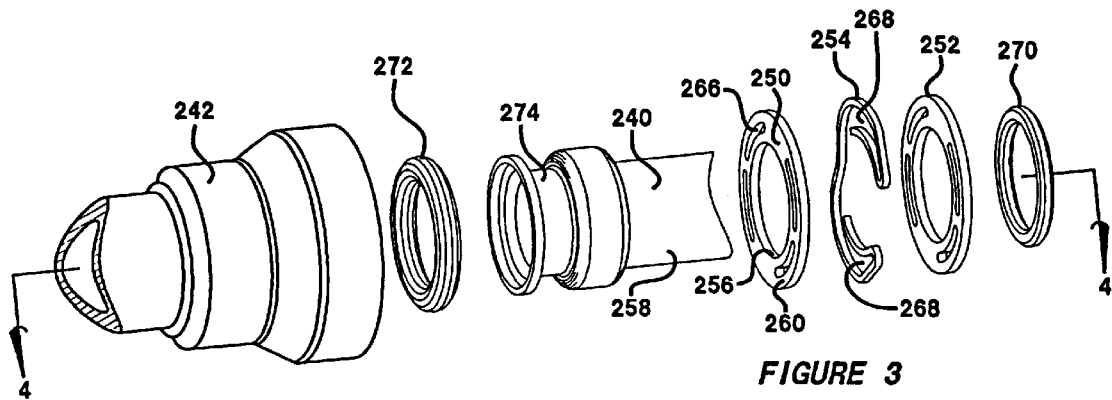
FIG. 3 is an exploded perspective view of a first alternate embodiment of the present invention conduit coupling of FIG. 2.
Figure 4:
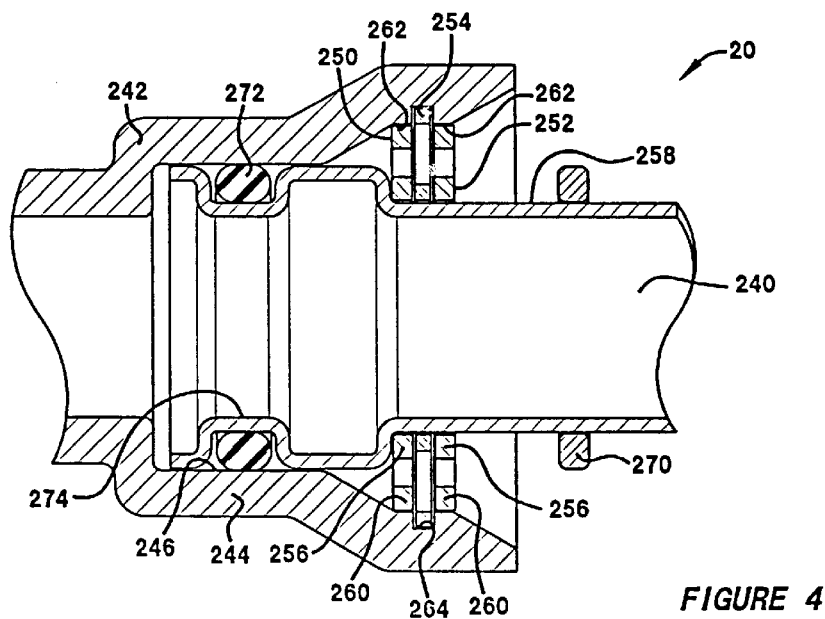
FIG. 4 is a sectional view, taken along line 4—4 of FIG. 3, of the first alternate embodiment of the present invention conduit coupling.

In FIGS. 3 and 4 an alternate embodiment of the present invention conduit coupling 20 is shown. In this embodiment, a male conduit 240 is identical to that of the first preferred embodiment. Furthermore, a female member 242 is similar to that disclosed in the second preferred embodiment except that a receptacle 244 has a substantially uniform inside surface 246. This exemplary embodiment illustrates the use of a first auxiliary attachment ring 250 and a second auxiliary attachment ring 252 in combination with a quick connect fastener 254. Quick connect fastener 254 is similar in design to that shown in FIG. 7.

Both auxiliary attachment rings 250 and 252 are annular in shape and have an inner attachment section 256 which compressibly engages around an exterior surface 258 of male conduit 240. Auxiliary attachment rings 250 and 252 further have an outer attachment section 260 which snugly rides against a pair of intermediate cylindrical surfaces 262 longitudinally bordering an undercut groove 264 within female member 242. Quick connect fastener 254 is longitudinally trapped between the pair of auxiliary attachment rings 250 and 252. This construction allows quick connect fastener 254 to be made from a more radially resilient and less longitudinally rigid material as compared to the prior embodiments. This is accomplished by allowing the pair of auxiliary attachment rings 250 and 252 to longitudinally support quick connect fastener 254. Furthermore, four arcuate slots 266 are located between inner and outer attachment sections 256 and 260, respectively, of auxiliary attachment rings 250 and 252 such that installation or disassembly tools can be inserted within spaces 268 of quick connect fastener 254. An annular bushing 270 can optionally surround exterior surface 258 of male conduit 240 proximate with second auxiliary attachment ring 252. This bushing 270 aids in ensuring the desired longitudinal location of quick connect fastener 254 during insertion thereof within female member 242. An O-ring seal 272 surrounds a nominal diametral portion 274 of male conduit 240.

Figure 5:
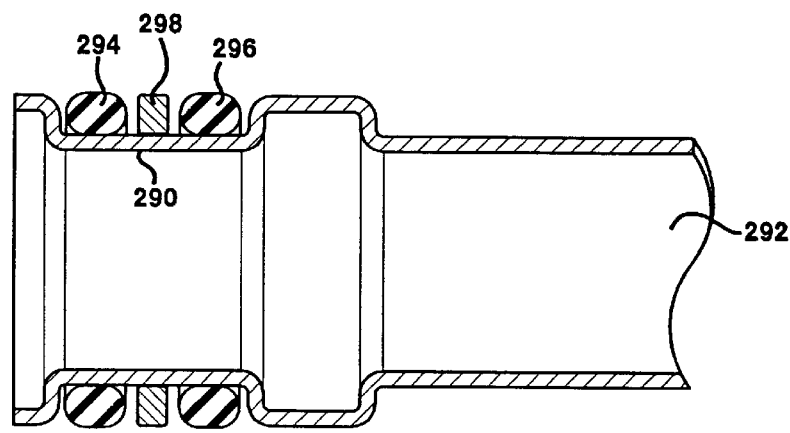
FIG. 5 is a sectional view showing a second alternate embodiment of a male conduit and means for sealing of the present invention conduit coupling of FIG. 2.

Referring to FIG. 5, a nominal diametral portion 290 of a male conduit 292 is longitudinally lengthened so as to provide a sealing seat for a pair of O-ring type seals 294 and 296 with a washer 298 longitudinally located therebetween. Of course, one skilled in the art would appreciate that various alternating patterns of expanded diametral portions and nominal diametral portions can be longitudinally positioned along a male conduit without deviating from the present invention.

While various embodiments of this conduit coupling have been disclosed, it will be appreciated that various modifications may be made without departing from the present invention. For example, the quick connector can be of a type disclosed within the parent application. Furthermore, a non-quick connect fastener such as a bolted-on flange or threaded fitting fastener can be used to join a male conduit to a female member. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A conduit coupling for use in communicating a fluid media therethrough comprising:
   a female preassembly having a receptacle with a cylindrical inside surface thereof defining a bore extending therethrough, said bore further defining a longitudinal axis centrally therealong;

a male preassembly including a male conduit having a cylindrical cross sectional shape, an exterior surface, and a distal edge thereto, said male conduit further having a first expanded diametral portion located closest to said distal edge and a second expanded diametral portion displaced longitudinally therealong, said first and second expanded diametral portions separated by a nominal diametral portion longitudinally therebetween;

said male preassembly including means for sealing externally surrounding said nominal diametral portion of said male conduit therearound;

said male preassembly further including a fastener having a first attachment section thereof attachable to said male conduit adjacent to said second expanded diametral portion thereof opposite from said distal edge thereacross, said fastener further having a second attachment section thereof attachable to said female member thereagainst;

said male preassembly being at least partially insertable within said receptacle bore such that said exterior surface of said male conduit at said first and second expanded diametral portions thereof are in registry with said receptacle inside surface thereagainst, said sealing means substantially preventing said fluid media from passing between said exterior surface of said male conduit and said inside surface of said female member; and said fastener coupling a predetermined portion of said male conduit within said female member so as to prevent inadvertent longitudinal disassembly therefrom.

2. The conduit coupling of claim 1 wherein: said first attachment section of said fastener has an inner portion attachable to said male conduit and said second attachment section of said fastener has an outer portion attachable to said female member.

3. The conduit coupling of claim 2 wherein said quick connect fastener includes:

said first attachment section is configured from a pair of inner jaws defining a substantially semi-circular shape therebetween, said inner jaws compressibly attaching to said exterior surface of said male conduit substantially therearound; and said second attachment section is configured from a pair of outer jaws substantially surrounding said pair of inner jaws therewithin, said pair of outer jaws substantially defining a circular shape therebetween, said pair of outer jaws connecting to said pair of inner jaws therewithin by a neck segment therebetween, said pair of outer jaws further having a pair of distal ends thereof with a gap therebetween, said pair of outer jaws coupled to said female member thereabout.

4. The conduit coupling of claim 2 wherein said fastener includes:

said first attachment section is configured from a pair of inner jaws defining a substantially semi-circular shape therebetween, said inner jaws compressibly attaching to said exterior surface of said male conduit substantially therearound; and said second attachment section is configured from a pair of outer jaws substantially surrounding said pair of inner jaws therewithin, said pair of outer jaws substantially defining a circular shape therebetween, said pair of outer jaws joined to said pair of inner jaws at an elbow thereof.

5. The conduit coupling of claim 4 wherein said fastener further includes:

a first auxiliary attachment ring having an inner attachment section engagable around said exterior surface of said male conduit therein and having an outer section substantially surrounding said inner attachment section therewithin, said first auxiliary ring longitudinally located between said pair of inner jaws of said quick connect fastener and said second diametrally expanded portion of said male conduit thereagainst; and a second auxiliary attachment ring having an inner attachment section engagable around said exterior surface of said male conduit therein and having an outer section surrounding said inner attachment section therewithin, said second auxiliary attachment ring longitudinally located adjacent to said pair of inner jaws of said quick connect fastener opposite from said first auxiliary attachment ring thereacross.

6. The conduit coupling of claim 5 wherein:

said first and second auxiliary attachment rings have a substantially annular shape thereto and have a plurality of arcuate slots juxtapositioned between each of said inner attachment sections and each of said outer sections thereof.

7. The conduit coupling of claim 1 wherein said sealing means includes:

a first seal located externally adjacent to said nominal portion of said male conduit therearound.

8. The conduit coupling of claim 7 wherein said sealing means includes:

a second seal located externally adjacent to said nominal portion of said male conduit therearound.

9. The conduit coupling of claim 8 further comprising:

a washer located between said first and second seals adjacent thereto.

10. The conduit coupling of claim 1 wherein:

said inside surface of said female member is further defined by a first inside surface and a second inside surface, said first inside surface is closer to said open end of said female member than said second inside surface longitudinally adjacent thereto; and said first expanded diametral portion of said male conduit has a diameter thereof congruent with said first inside surface of said female member, said second expanded diametral surface has a relatively greater diameter thereof congruent with said second side surface of said female member therewith.

11. The conduit coupling of claim 1 wherein said female member includes:

a receptacle having a flange therearound closest to an open end thereof;

a collar fitting around said receptacle proximate with said flange thereupon, said collar further having an inwardly turned arm defining a shoulder thereabout; and said second attachment section of said fastener couplable between said flange and said shoulder of said collar thereagainst.

12. The conduit coupling of claim 1 wherein said female member includes:

a frusto-conical tapered lead-in surface proximate with an open end thereof, said tapered lead-in surface having a constricted portion thereof;

an intermediate inside surface juxtapositioned longitudinally adjacent to said constricted portion of said tapered lead-in surface;

a grooved undercut radially extending outward from said intermediate surface; and said second attachment section of said fastener radially compressible by interference with said tapered lead-in surface thereagainst during longitudinal insertion therepast, said second attachment section of said fastener engaging said undercut thereabout when longitudinally located therewith.

13. The conduit coupling of claim 1 further comprising:

means for preventing longitudinal translation of said quick connect fastener along said male conduit.

14. The conduit coupling of claim 13 wherein:

said preventing means includes an annular bushing longitudinally affixed around said exterior surface of said male conduit.

15. A conduit coupling for use in combination with a female member having a receptacle with a cylindrical inside surface thereof defining a bore extending therethrough, said bore further defining a longitudinal axis centrally therealong, said conduit coupling comprising:

a male conduit having a cylindrical cross sectional shape defined by an exterior surface, having a distal edge, said male conduit further having a first expanded diametral portion located closest to said distal edge and a second expanded diametral portion displaced longitudinally therealong, said first and second expanded diametral portions separated by a nominal diametral portion longitudinally therebetween, said first and second expanded diametral portions having outer bearing surfaces formed thereon, said second expanded diametral portion including a pair of side walls with said outer bearing surface being formed between said side walls, said surface defining a constant diameter between said walls;

an elastomeric seal externally surrounding said nominal diametral portion of said male conduit therearound;

a quick connect fastener having a first attachment section attachable to said male conduit adjacent to said second expanded diametral portion, said fastener further having a second attachment section attachable to said female member thereagainst, said fastener being substantially planar;

said male conduit insertable within said receptacle bore such that said outer bearing surface of said first and second expanded diametral portions thereof are in registry with said receptacle inside surface thereagainst for inhibiting axial misalignment of said male conduit in relation to said bore of said female member, said seal substantially preventing said fluid media from passing between said exterior surface of said male conduit and said inside surface of said female member; and said fastener coupling a predetermined portion of said male conduit within said female member so as to prevent inadvertent longitudinal disassembly therefrom.

16. A conduit coupling for use n attaching a male conduit having an exterior surface thereof into a female member having an inside surface thereof, said conduit coupling comprising:

a quick connect fastener having a pair of inner jaws attachable around said exterior surface of said male conduit, said quick connect fastener further having a pair of outer jaws attachable to female member;

a first auxiliary attachment ring having an inner attachment section engageable around said exterior surface of said male conduit therein and having an outer section slidable along said inside surface of said female member;

a second auxiliary attachment ring having an inner attachment section engageable around said exterior surface of said male conduit therein and having an outer section slidable along said inside surface of said female member; and said first and second auxiliary attachment rings longitudinally displaced along said male conduit with said quick connect fastener juxtapositioned therebetween.

17. The conduit coupling of claim 16 wherein:

said first and second auxiliary attachment rings have a substantially annular shape thereto and have a plurality of arcuate slots juxtapositioned between each of said inner attachment sections and each of said outer sections thereof.

18. The conduit coupling of claim 16 further comprising:

means for preventing longitudinal translation of said quick connect fastener along said male conduit.

19. The conduit coupling of claim 18 wherein:

said preventing means includes an annular bushing longitudinally affixed around said exterior surface of said male conduit.

20. A conduit coupling for use in attaching a male member having an exterior surface and a distal end thereof into a female member having an inside surface thereof, said conduit coupling comprising:

a male member;

a fastener ring being flat and having substantially planar sides and having an inner attachment section engageable with an exterior surface of said male member and an outer section engageable with said inside surface of said female member for limiting relative longitudinal movement between said male and female members, said fastener ring being disposed entirely within said female member when said male member is lockingly secured thereto, a first expanded diametral portion at the distal end defining an edge of said male member and a spaced apart second expanded diametral portion on said male member adjacent the distal end thereof both engageable with said inside surface of said female member, said fastener ring being disposed adjacent said second expanded diametral portion when said male member is lockingly secured to said female member, and O-ring sealing means disposed axially between said first expanded diametral portion and said second expanded diametral portion and providing a fluid tight seal between said exterior surface of said male member and said interior surface of said female member.

* * * * *